United States Patent [19]

Masaki

[11] Patent Number: 4,706,248
[45] Date of Patent: Nov. 10, 1987

[54] SEMICONDUCTOR INTEGRATED CIRCUIT WITH ERROR CORRECTION FUNCTION INCORPORATED THEREIN

[75] Inventor: Yoshifumi Masaki, Nara, Japan

[73] Assignee: Sharp Kabushiki Kaisha, Osaka, Japan

[21] Appl. No.: 723,507

[22] Filed: Apr. 15, 1985

[30] Foreign Application Priority Data

Apr. 13, 1984 [JP] Japan ................................. 59-75542

[51] Int. Cl.[4] .............................................. G06F 11/00
[52] U.S. Cl. ........................................... 371/3; 371/30
[58] Field of Search .................... 371/3, 7, 15, 29, 38, 371/30, 37

[56] References Cited

U.S. PATENT DOCUMENTS

| | | | |
|---|---|---|---|
| 4,205,301 | 5/1980 | Hisazawa | 371/3 |
| 4,277,844 | 7/1981 | Hancock | 371/38 |
| 4,335,459 | 6/1982 | Miller | 371/38 |
| 4,355,391 | 10/1982 | Alsop | 371/37 |
| 4,417,339 | 11/1983 | Cantarella | 371/38 X |
| 4,498,175 | 2/1985 | Nagumo | 371/37 |
| 4,507,784 | 3/1985 | Procter | 371/3 X |
| 4,561,095 | 12/1985 | Kham | 371/3 X |

OTHER PUBLICATIONS

D. A. Beaven, "Error Correction on Very Large Scale Integrated Memory Chips", IBM Tech. Bulletin, vol. 22, No. 2B 1/1980.

G. Tate, "EDC Chip Boots Memory Reliability", Electronic Design 9/1980, vol. 28, No. 18, pp. 151-154.

Primary Examiner—Jerry Smith
Assistant Examiner—Robert W. Beausoliel, Jr.
Attorney, Agent, or Firm—Birch, Stewart Kolasch & Birch

[57] ABSTRACT

A semiconductor integrated circuit has a judgment circuit incorporated to determine whether or not an error correction function has operated. In particular, this enables detection of the operating condition of the error correction function in an integrated circuit with an error correction function incorporated, through the addition of a simple circuit, and in turn enables checking of whether the device was originally of good quality, or is one repaired by the addition of an error correction function to a defective device.

5 Claims, 3 Drawing Figures

SEMICONDUCTOR INTEGRATED CIRCUIT WITH ERROR CORRECTION FUNCTION INCORPORATED THEREIN

BACKGROUND OF THE INVENTION

This invention concerns a semiconductor integrated circuit with an error correction function incorporated therein, particularly an integrated circuit that can determine whether or not the built-in error correction circuit has operated or not.

One method to increase the production yield of semiconductor integrated circuits is to repair defective devices by incorporating an error correction function. Simply incorporating an error correction function is sufficient if the only objective is to increase production yield, but in order to determine the influence the error correction function has on yield and on the electrical characteristics of the device, it must be differentiated whether the device was of good quality from the start, or it is working normally due to the functioning of an error correction function. Acquiring this type of data will simplify the management of the integrated circuit production process and help to increase product yield.

However, with present integrated circuits, the error correction function operates when necessary, and it is usually not possible to detect whether the device has been converted into one of normal quality by the incorporation of a error correction function in a defective device, thus making adequate quality control difficult.

OBJECT AND SUMMARY OF THE INVENTION

The above problems in the conventional circuit have been used as a model for the integrated circuit in this invention, with a circuit incorporated to judge whether or not the error correction function has operated to solve the above problems.

With this invention, when incorporating an error correction function in an integrated circuit, the operating condition of the error correction function can be determined by adding a simple circuit, in order to check whether the device was originally of good quality, or if a defective device was provided with an error correction function, and in turn enable more complete quality control of integrated circuits.

DETAILED DESCRIPTION OF THE INVENTION

An arbitrary error correction symbol can be applied in this invention, but an explanation will be made using the SEC-DED symbol.

Figure 1:
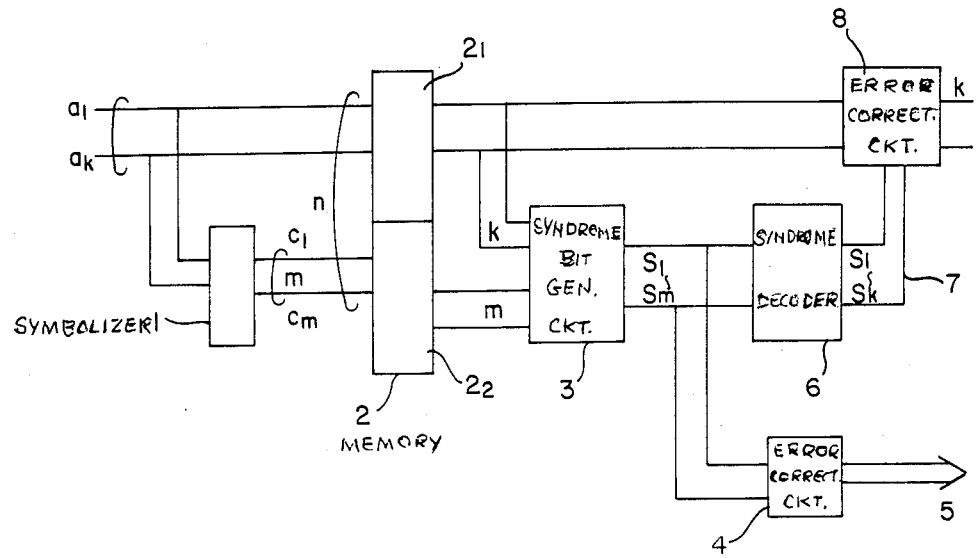
FIG. 1 is a block diagram showing the main portions of the integrated circuit with an error correction function incorporated therein.

FIG. 1 is a block diagram showing the main parts of an integrated circuit in which the SEC-DEC symbol error correction method has been adopted, with c1–cm detecting bits which consist of m bits formed when k bits of information bits a1–ak transmitted from a CPU, pass through the symbolizer (1). These detecting bits c1–cm are written together with the above information bits a1–ak as n=k+m symbol bits in the main memory (2). An information bit range $2_1$ and detecting bit range $2_2$ is provided in the main memory (2) according to the information input, and the respective k bit and m bit information are written there. Since an error bit can be included with the information read from the main memory (2), error detection and error correction can be effected.

In other words, the bit information (k+m) read from the main memory (2) is input into the syndrome bit generation circuit (3), and m bits of syndrome bits s1–sm are formed. These syndrome bits s1–sm are input into the error detection circuit (4), it is determined whether or not the information contains an error bit to form a signal (5) informing whether or not there is an error. The above syndrome bits s1–sm are input into the syndrome decoder (6), and an error bit position signal (7) is formed. This error bit position signal (7) is read and input into the error correction circuit (8) together with the information bits read from the main memory (2), to correct the information bits for information without any error.

With the above semiconductor integrated circuit with error correction function incorporated therein, a circuit to judge whether or not the error correction function has operated is included, which is useful in the inspection of semiconductor integrated circuits and in determining the operating condition and effect of the error correction function when measuring circuit characteristics.

Figure 2:
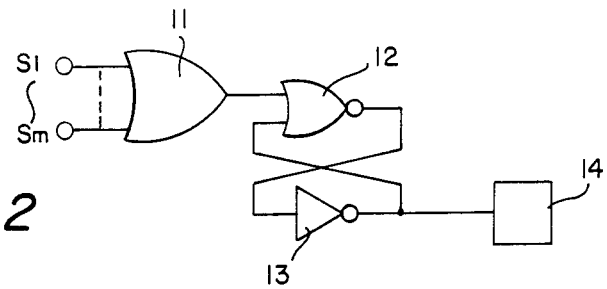
FIG. 2 is a block diagram showing an embodiment of the error correction function judgment circuit of this invention.

FIG. 2 is a block diagram showing the operation judgment circuit of the error correction function, with an OR circuit (11) to which the syndrome bits s1–sm generated by the above syndrome bit generation circuit (3) are input, and the output of the said OR circuit (11) is applied to one side of NOR circuit (12). A NOT circuit (13) is provided to which the output of the said NOR circuit (12) is input, and the output signal of the said NOT circuit (13) is applied to the other input end of the above NOR circuit (12) and is also fed out to output pad (14). The said output pad (14) is provided for easily determining the operation of the error correction function during inspection of wafers, and this determination can be made by feeding out the output of the above NOR circuit (12) instead of feeding out the output of the NOT circuit (13). In addition to operation confirmation of the error correction function, the output pad (14) can also be used to initialize an additional external error correction function judgment circuit which will be explained later.

In the judgment circuit that is of the above composition, if all the syndrome bits s1–sm are logic "0", the error symbol is symbolized as having no error, and the syndrome bits s1–sm are assumed to all be "0" before the circuit is operated after power is turned on, and the output of the NOT circuit (13) and the NOR circuit (12) are respectively initialized as "0" and "1".

When operation of the integrated circuit is commenced, and an error is detected when the error detection function operates as shown in FIG. 1, and at least one of the s1–sm syndrome bits changes to logic "1". This causes the output of the OR circuit (11) to change to "1", changes the output of the NOR circuit (12) to "0", changing the output of the NOT circuit (13) to "1". Since the output of the NOT circuit (13) is input to the other side of the NOR circuit (12), even after all the syndrome bits s1–sm return to "0", the above condition is memorized, and is output to the output pad (14). Accordingly, with this integrated circuit, the signal level of the output pad (14) can be measured after a series of circuit operations during the inspection process, enabling the user to confirm that the error correction function has operated if the level is logic "1".

Furthermore, in the above operation, the error correction symbol was symbolized as having no errors if all of the syndrome bits s1–sm are logic "0", with these syndrome bits directly input into the OR circuit which comprises the judgment circuit, but when error correction symbolization is effected to show an error when the syndrome bit(s) conversely change from logic "1" to logic "0", the NOT syndrome bit signal is input into the above OR circuit (11).

By detecting if the output of the above OR circuit (11) changes from logic "0" to "1", it can be determined whether the integrated circuit has passed as a good device through the operation of an error correction function. Since these results are held in the memory circuit which comprises the NOR circuit (12) and NOT circuit (13), the output signal of the memory circuit can be inspected via the output pad (14) after the normal operation inspection, to judge whether or not the error correction function has operated.

Furthermore, when checking whether the error correction function has operated after all syndrome bits s1–sm are returned to "0", the memory circuit which comprises the NOR circuit (12) and NOT circuit (13) can be reset by externally forcing the metal pad (14) to "0", enabling confirmation of whether or not the error correction function has operated when circuit operation is commenced.

When symbolization is effected as the error detection condition when at least one of the s1–sm syndrome bits is "1", if the output pad (14) returns to "1" when the level is measured after being forced to "0", the error detection condition can be determined.

Figure 3:
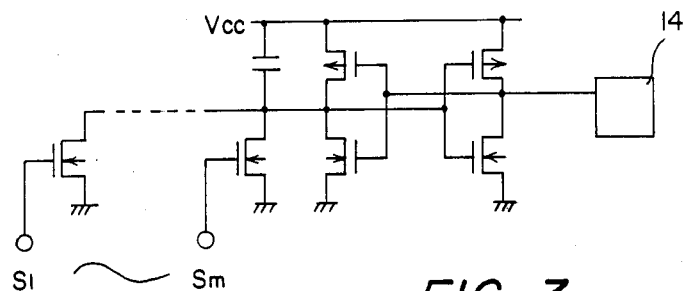
FIG. 3 is a diagram showing a concrete example of the circuit in FIG. 2.

FIG. 3 shows an embodiment of the above judgment circuit which comprises a CMOS circuit. An N channel MOSFET is provided in which the s1–sm syndrome bits are input to each gate, the output of the N channel MOSFET is input to a flip flop which comprises a CMOS inverter which is cross connected, and the output of the flip flop is output to the output pad 14.

What is claimed is:

1. A semiconductor integrated circuit, comprising:
   input means for receiving information;
   memory means for storing the information received at said input means;
   error detection means for detecting the occurrence of an error in the reception of said information and producing an error detection signal indicative thereof;
   error correction means, responsive to said error detection signal, for correcting the error so detected; and
   judgment means, responsive to the detection of an error by said error detection means, for producing a judgment signal indicative of an operation of said error correction means in response to the error detection signal produced by said error detection means.

2. The semiconductor integrated circuit as claimed in claim 1, wherein said error detection means comprises syndrome bit generating means, said error detection signal comprising a plurality of syndrome bits produced by said generating means,
   said judgment means comprising an OR circuit having inputs connected to said plurality of syndrome bits, the output of said OR circuit forming said judgment signal.

3. The semiconductor integrated circuit of claim 2, further comprising:
   judgment memory means connected to said judgment means for memorizing the production of a judgment signal indicative of the operation of the error correction means.

4. The semiconductor integrated circuit of claim 3, wherein said judgment memory means comprises:
   a NOR circuit having an input connected to the output of said OR circuit; and
   a NOT circuit having an input connected to the output of said NOR circuit,
   the output of said NOT circuit being connected to another input of said NOR circuit.

5. The semiconductor integrated circuit of claim 4, further comprising:
   an output pad,
   the output of said NOT circuit also being connected to said output pad.

* * * * *